US010575568B2

(12) United States Patent
Lehna et al.

(10) Patent No.: US 10,575,568 B2
(45) Date of Patent: Mar. 3, 2020

(54) SMART BODY SHAPING SYSTEM

(71) Applicants: Shannon Lehna, Boucherville (CA); Nathalie Laflamme, Repentigny (CA)

(72) Inventors: Shannon Lehna, Boucherville (CA); Nathalie Laflamme, Repentigny (CA)

(73) Assignees: Shannon Lehna (CA); Nathalie Laflamme (CA)

( * ) Notice: Subject to any disclaimer, the term of this patent is extended or adjusted under 35 U.S.C. 154(b) by 107 days.

(21) Appl. No.: 15/927,620

(22) Filed: Mar. 21, 2018

(65) Prior Publication Data

US 2019/0150526 A1 May 23, 2019

Related U.S. Application Data

(60) Provisional application No. 62/590,327, filed on Nov. 23, 2017.

(51) Int. Cl.
| | |
|---|---|
| *A41C 3/10* | (2006.01) |
| *A41C 3/06* | (2006.01) |
| *A41C 3/00* | (2006.01) |
| *G06F 13/28* | (2006.01) |
| *A41B 9/04* | (2006.01) |
| *A41C 3/14* | (2006.01) |

(52) U.S. Cl.
CPC .............. *A41C 3/105* (2013.01); *A41C 3/005* (2013.01); *A41C 3/06* (2013.01); *G06F 13/28* (2013.01); *A41B 9/04* (2013.01); *A41B 2400/38* (2013.01); *A41C 3/0028* (2013.01); *A41C 3/146* (2013.01)

(58) Field of Classification Search
CPC ............ A41C 3/105; A41C 3/005; A41C 3/06

USPC ........................................................ 450/38
See application file for complete search history.

(56) References Cited

U.S. PATENT DOCUMENTS

| | | | | |
|---|---|---|---|---|
| 3,326,218 A | * | 6/1967 | McAlpine | A41C 3/105 450/38 |
| 5,347,656 A | * | 9/1994 | Fabritz | A41C 3/105 2/67 |
| 5,833,515 A | | 11/1998 | Shahbazian et al. | |

(Continued)

FOREIGN PATENT DOCUMENTS

| | | |
|---|---|---|
| CN | 205459740 U | 8/2016 |
| WO | 2012075298 A2 | 6/2012 |
| WO | 2014071292 A1 | 5/2014 |

OTHER PUBLICATIONS

International Search Report and Written Opinion issued in PCT application No. PCT/CA2018/000157 dated Nov. 28, 2018.

*Primary Examiner* — Gloria M Hale
(74) *Attorney, Agent, or Firm* — Lavery, De Billy, LLP; Gwendoline Bruneau

(57) ABSTRACT

A system for shaping a body part. The system includes a chamber with a resilient sidewall, which is snuggly located against the body part. A wirelessly operated pump connected to the chamber for varying an amount of a fluid located in the chamber. The pump has a signal receiver connected to it. A signal transmitter that is in wirelessly connected to the pump. The transmitter is electronically connected a body part shape database. The database and the transmitter are configured to wirelessly transmit a signal to the pump, when a user selects a desired body part shape from the database. This activates the pump so as to vary the amount of the fluid in the chamber and so achieves the desired body part shape.

19 Claims, 16 Drawing Sheets

(56) References Cited

U.S. PATENT DOCUMENTS

| | | | |
|---|---|---|---|
| 5,904,607 A | 5/1999 | Abdali | |
| 6,080,037 A | 6/2000 | Lee et al. | |
| 6,302,760 B1* | 10/2001 | Dai | A41C 3/105 |
| | | | 450/38 |
| 6,354,906 B1 | 3/2002 | Liu | |
| 6,461,221 B1* | 10/2002 | Stilwell | A41C 3/0007 |
| | | | 450/38 |
| 6,691,730 B1* | 2/2004 | Chen | A47C 27/081 |
| | | | 137/223 |
| 6,795,875 B2 | 9/2004 | Placik | |
| 8,641,475 B1* | 2/2014 | Hung-Ming | A41C 3/10 |
| | | | 450/38 |
| 9,161,577 B1* | 10/2015 | Harper | A41D 7/003 |
| 9,468,236 B1* | 10/2016 | Sherry | A41C 3/105 |
| 9,883,701 B2* | 2/2018 | Lima | A41C 3/105 |
| 9,984,588 B1 | 5/2018 | Barker | |
| 2010/0068973 A1* | 3/2010 | Tseng | A41C 3/105 |
| | | | 450/55 |
| 2011/0065358 A1* | 3/2011 | Fleeton | A41C 3/105 |
| | | | 450/38 |
| 2013/0012100 A1* | 1/2013 | Chen | A41C 3/105 |
| | | | 450/38 |
| 2013/0260639 A1* | 10/2013 | Lin | A41C 3/105 |
| | | | 450/38 |
| 2015/0351465 A1* | 12/2015 | Duraku | A41C 3/105 |
| | | | 450/38 |

* cited by examiner

SMART BODY SHAPING SYSTEM

CROSS-REFERENCE TO RELATED APPLICATION

Priority to previously filed United States provisional patent application, serial number U.S. 62/590,327, filed on Nov. 23, 2017, is hereby claimed, the entire contents of which are incorporated by reference in its entirety.

TECHNICAL FIELD

The present relates to body-shaping garments, and more particularly to a wireless pump system for shaping a body part or for enhancing the size of the body part.

BACKGROUND

Body shaping and body part size enhancement products are commonplace in today's garment industry. Such products, generally marketed to female customers, serve to enhance the size and/or shape of a body part, or re-shape the body part. For example, enhancement products can be used to enhance the perceived size of one breast or both breasts, and the size or depth of a cleavage. Other garments are marketed to hide or re-shape so-called problem areas such as excess fat around the lower abdomen, the waist and the thighs; excess fat that would otherwise bulge outwardly at the top of, for example, trousers, or undergarments. This is perceived by many as rather unsightly and an indicator of poor diet and a sedentary lifestyle. Garments such as corsets or tightening bands are designed specifically to compress these areas to give the impression that the wearer has a small waist or is slimmer than the wearer truly is. Similarly, females who may be self-conscious about their size of their buttocks often turn to tightening clothes or underwear if their buttocks are larger than they would like.

In many cases, self-consciousness resulting from a poorly perceived body image can be detrimental to self-confidence, which can ultimately have a negative effect on the lifestyle of the female. Instead of, or in addition to exercising, a number of females may look for a quick and easy way to reduce or enhance the size and/or shape of their breasts, buttocks, waistline, thighs, hips or upper arms.

Cosmetic surgery can be used to either enhance breast or buttock size or shape using, for example, implants. This is particularly the case after a single or double mastectomy in which one or both diseased breasts are removed. However, any surgical procedure carries inherent risks and can, if not performed by a skilled cosmetic surgeon, leave the patient with unsightly scaring, and can lead to infection, which can be fatal in some cases. Also, in some instances breast implants can fail in situ causing life-threatening leakage of implant material into the body. Liposuction, using surgical techniques, can be used to remove excess adipose tissue from the lower abdomen, waist or buttocks. In addition to the dangers, cosmetic surgery is prohibitively expensive for many people.

In the female garment industry, lingerie is used to enhance the look of the female body. Typically, breast enhancement products include pads or pumps to enhance the cleavage by squeezing the breasts together and pushing them upwardly. Many women complain that this type of clothing rarely fits correctly causing discomfort to the wearer.

A number of patented designs exist that are used to enhance the size and/or shape of the body part, in particularly the breasts and cleavage of the user. Examples of such designs are given below:

U.S. Pat. No. 5,904,607 issued on May 18, 1999 to Jacob Abdali for "Cleavage Enhancement Brassiere";

U.S. Pat. No. 5,833,515 issued on Nov. 10, 1998 to Khachik Shahbazian et al. for "Inflatable Breast Pads for a Brassiere";

U.S. Pat. No. 6,080,037 issued on Jun. 20, 2000 to In-Han Lee et al. for "Brassiere";

U.S. Pat. No. 6,302,760 issued on Oct. 16, 2001 to Fu Ming Dal for "Air Bag Type Brassiere";

U.S. Pat. No. 6,354,906 issued on Mar. 12, 2002 to Shan Pu Liu for "Brassiere with Adjustable Cup Support Means";

U.S. Pat. No. 6,795,875 issued on Sep. 28, 2004 to Otto J. Placik for "Breast Implant Sizing Apparatus and Method".

Disadvantageously, none of the above systems, or devices permit bespoke enhancement or shaping of the body part. In particular, even though a number of the above-mentioned designs use pumping mechanisms to inflate and deflate a bladder-type implant, none of the pumping mechanisms are remotely controlled.

Thus, there is a need for an improved body part shaping and sizing/re-sizing garment.

BRIEF SUMMARY

We have designed a device, system and method that significantly reduces, or essentially eliminates, the problems of contemporary body shaping garments. To achieve this, we have designed a new and unobvious system in which a pump apparatus selectively inflates or deflates a chamber located in a garment after the pump receives a request to activate from a mobile electronic device. The mobile electronic device includes an accessible database containing information uploaded thereto by a user so that the user can, in real time, wirelessly control the amount of inflation or deflation needed to achieve a desired body shape, whether that be an enhanced breast size, buttock size, or trimmer waist line. The mobile electronic device includes a display which includes data that can be synchronized with a computer database remotely.

Accordingly, in one embodiment there is provided a system for shaping a body part, the system comprising:
a chamber having a resilient sidewall snuggly located against the body part, and a wirelessly operated pump in fluid communication with the chamber for varying an amount of a fluid located in the chamber, the pump having a signal receiver connected thereto; and
a signal transmitter in wireless communication with the pump, the signal transmitter being in electronic communication with a body part shape database, the database and the transmitter being configured to wirelessly transmit a first signal to the pump, when a user selects a first desired body part shape from the database, to activate the pump so as to vary the amount of the fluid in the chamber thereby achieving the first desired body part shape.

In one example, the body part shape database and the signal transmitter are configured to wirelessly transmit a second signal to the pump when a user selects a second desired body part shape from the database to activate the pump so as to vary the amount of the fluid in the chamber thereby achieving the second desired body part shape. The first signal activates the pump to pump an amount of the fluid into the chamber; and the second signal activates the pump to pump an amount of the fluid out of the chamber. The amount of fluid located in the chamber is sufficient to vary a shaping force the resilient sidewall applies against the body part to achieve the first or the second desired body part shape.

In one example, the chamber is in communication with a garment portion, the chamber being located adjacent the body part. The garment portion includes a garment portion resilient sidewall cooperable with the chamber resilient sidewall. The the chamber is located in a garment pouch. The fluid pump and the chamber are disposed in a garment pouch located in the garment portion. The garment pouch is located snug against the skin of the user's body part to be shaped. The garment portion is a cup of a brassiere, the garment pouch being located snuggly against the underside of a breast. The garment portion include both cups of a brassiere, each garment pouch being located snuggly against the underside of each breast. The garment portion is a band located underside of both breast to lift and shape breasts or to enhance cleavage. The garment portion is a band located around the waist of a user so as to provide an inwardly directed force to re-shape the waist of the user. The garment portion is at least one pad located around the waist of a user so as to provide an inwardly directed force to re-shape the waist of the user. The garment portion is a band located around the hips of a user so as to provide an inwardly directed force to re-shape the hips of the user. The garment portion is at least one pad located around the hips of a user so as to provide an inwardly directed force to re-shape the hips of the user. The garment portion is at least one pad located around or above one or both buttocks of a user so as to provide an upwardly directed force to uplift the buttocks of the user. The garment portion is one or two cups located snuggly against one or both buttocks of a user so as to shape the buttocks of the user. The garment portion is a band around each thigh so as to provide inwardly directed force to re-shape the hips of the user. The garment portion is a band around each upper arm so as to provide inwardly directed force to re-shape the upper arms of the user.

In another example, the chamber includes first and second sub-chambers. The pump is configured to selectively move fluid into and out of one or both of the first or second sub-chambers.

In another example, the chamber includes a resilient joint to permit movement between a collapsed configuration in which the fluid content is at a low volume and an inflated configuration. The resilient joint is an accordion joint. The resilient joint is a telescoping joint.

In yet another example, the body part shape database is stored on a mobile electronic device.

In still another example, the body part shape database is stored remotely on an external database and accessible using an internet connecting device. The mobile electronic device is a smart phone, a tablet, or a personal computer. The external database is located on a computer network. The computer network is the internet.

In one example, the body part shape database is located remote from a user, the body part shaping database being continuously updated, so that when the user requests the body part shaping data, the updated body part shape data is calculated and displayed on a mobile electronic device.

Accordingly, in another embodiment there is provided a device for use in shaping a body part, the device comprising:
  a chamber having a resilient sidewall snuggly located against the body part, and a wirelessly operated pump in fluid communication with the chamber for varying an amount of a fluid located in the chamber, the pump having a signal receiver connected thereto; and
  a signal transmitter in wireless communication with the pump, the signal transmitter being in electronic communication with a body part shape database, the database and the transmitter being configured to wirelessly transmit a first signal to the pump, when a user selects a first desired body part shape from the database, to activate the pump so as to vary the amount of the fluid in the chamber thereby achieving the first desired body part shape.

Accordingly, in another embodiment there is provided a body shaping garment, comprising:
  a garment portion having a garment portion resilient sidewall;
  a chamber having a resilient sidewall snuggly located against the body part, and a wirelessly operated pump in fluid communication with the chamber for varying an amount of a fluid located in the chamber, the pump having a signal receiver connected thereto, the garment resilient sidewall being cooperable with the chamber resilient sidewall; and
  a signal transmitter in wireless communication with the pump, the signal transmitter being in electronic communication with a body part shape database, the database and the transmitter being configured to wirelessly transmit a first signal to the pump, when a user selects a first desired body part shape from the database, to activate the pump so as to vary the amount of the fluid in the chamber thereby achieving the first desired body part shape.

Accordingly, in another embodiment there is provided a method for shaping a body part using an electronic device, the method comprising:
  selecting a first desired body part shape from a body part shape database stored on the electronic device so as to activate a pump located in a garment portion;
  wirelessly transmitting a signal to the pump located remote from the electronic device;
  receiving the signal at the pump; and
  pumping varying amounts of a fluid into and out of a fluid chamber located in the garment portion to vary the size of a force applied to the body part for a time sufficient to achieve the desired body shape.

Accordingly, in yet another embodiment there is provided a computer-implemented method for shaping a body part, the method comprising:
  on an electronic device, selecting a first desired body part shape from a body part shape database stored on the electronic device so as to activate a pump located in a garment portion;
  wirelessly transmitting a signal to the pump located remote from the electronic device;
  receiving the signal at the pump; and
  pumping varying amounts of a fluid into and out of a fluid chamber located in the garment portion to vary the size of a force applied to the body part for a time sufficient to achieve the desired body shape.

BRIEF DESCRIPTION OF THE DRAWINGS

These and other features of that described herein will become more apparent from the following description in which reference is made to the appended drawings wherein.

DETAILED DESCRIPTION

Definitions

Figure 1:
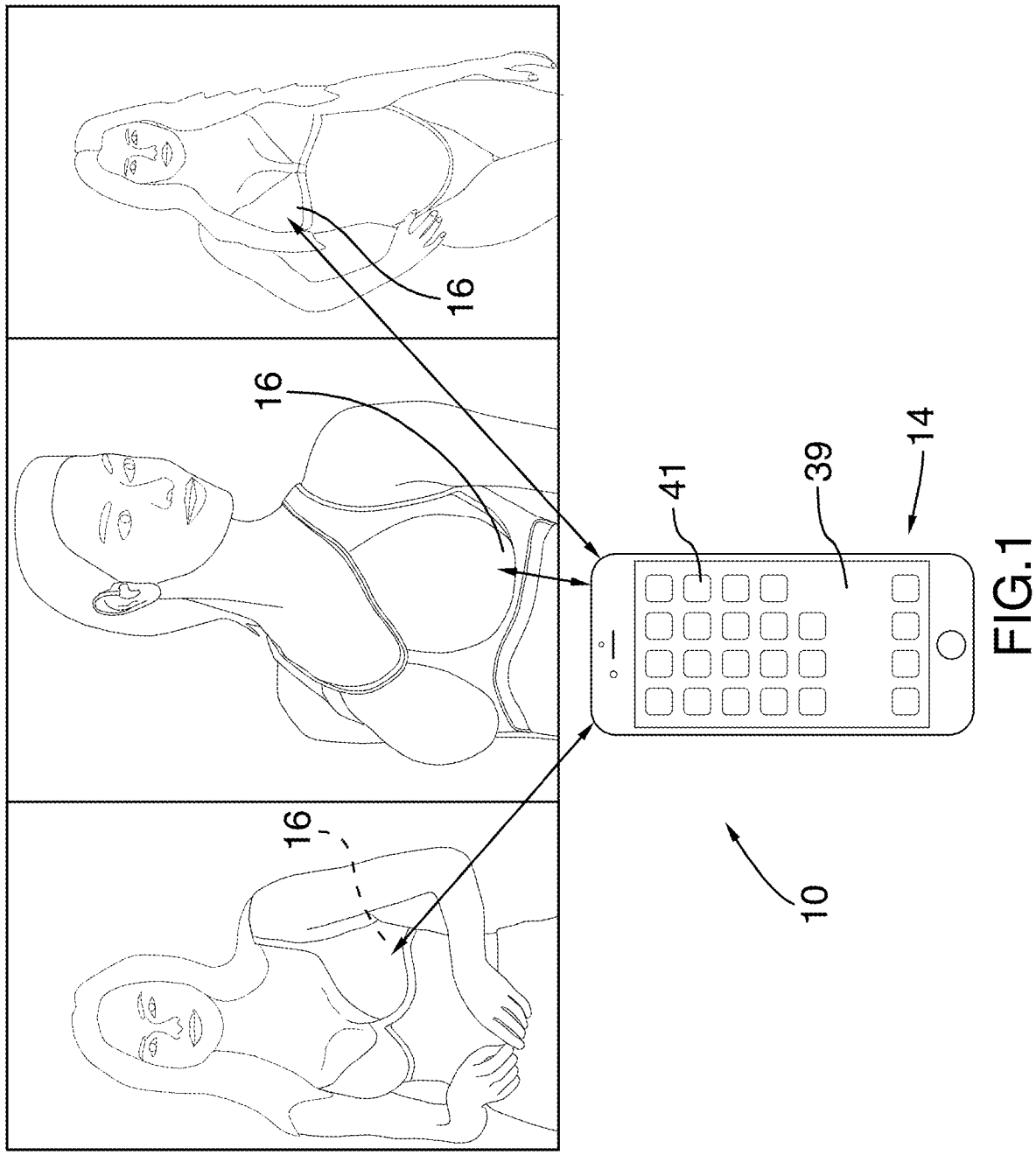
FIG. 1 is a schematic diagram showing an embodiment of a wireless system connecting to a selection of garments.

Unless otherwise specified, the following definitions apply:

The singular forms "a", "an" and "the" include corresponding plural references unless the context clearly dictates otherwise.

As used herein, the term "comprising" is intended to mean that the list of elements following the word "comprising" are required or mandatory but that other elements are optional and may or may not be present.

As used herein, the term "consisting of" is intended to mean including and limited to whatever follows the phrase "consisting of". Thus, the phrase "consisting of" indicates that the listed elements are required or mandatory and that no other elements may be present.

As used herein, the term "body part" is intended to mean, but is not limited to, one or both breasts, one or both buttocks, hips, waist, thighs, and the upper arms. Although the description uses female human body parts by way of example, a person of ordinary skill in the art will recognize that the system, method and devices described herein are also applicable to male human body parts such as the male genitalia, or for cross-dressing (transvestite) males, who desire the appearance of female body parts. Garments using the system, method and device described herein can also be used in a theatrical setting in which male actors wish to give the impression of being female.

As used herein, the terms "body part shaping", "body part re-shaping", "body part sizing", and "body part re-sizing", are used interchangeably throughout. The terms are intended to mean that the body part is externally manipulated using forces directed to push or pull the body part to give the impression that the body part is either smaller that it is or larger than it is; or that the body part shape is temporarily altered to give the impression of a more aesthetically pleasing appearance.

Certain embodiments of our design are described below with reference to systems, methods, apparatuses, and/or computer program products according to example embodiments of the design. It will be understood by one skilled in the art that one or more of the elements or blocks described below can be implemented manually or, in one example, by computer-executable program instructions. Likewise, some blocks of the block diagrams and flow diagrams may not necessarily need to be performed in the order presented, or may not necessarily need to be performed at all, according to some embodiments of the design. Further, the number of elements or blocks described below can be fewer or greater, and may include similar or other functions according to various embodiments.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

The System and Device

Referring now to FIGS. 1-3, and 12-17, a system for shaping one or more body parts is shown generally at 10. It will be clear to a person having ordinary skill in the art that the body part can be re-shaped or have its/their appearance modified using the system described herein. The body part or body parts that are of particular interest for shape and perceived size manipulation are, in the case of females, the breasts (and the depth or size of the cleavage therebetween), one or both of the buttocks, one or both thighs, the waist, and the hips. This may also be applicable to male body parts such as the buttocks, waist, hips and the male genitalia. Broadly speaking, the system 10 includes a wireless network 12 in which a mobile electronic device 14 is in wireless communication with a body shaping device 16. The body shaping device 16 includes a fluid chamber 18 and a wirelessly operated pump 20, which is in fluid communication with the fluid chamber 18. In the examples shown, the fluid is a gas, for example, air. A person of ordinary skill in the art will understand that the fluid can also be a liquid, such as water, saline, or a gel such as silicone, and the like. The wirelessly operated pump 20 is a micro-pump. Examples of the micro-pump include, but are not limited to, High Power Small Mini Micro Air Motor Pump Aquarium Oxygen Pump; micro Bluetooth™ blood pressure air pump; 2 volt micro battery operated Bluetooth™ air pump; DC micro air pump; micro air diaphragm pump; Micro-water-pump Bluetooth™; and Bluetooth™ micro vacuum pump.

The wirelessly operated pump 20 can be charged using a standard charger or it can be battery-operated, includes a signal receiver 22 for activating operation of the pump 20.

Figure 15:
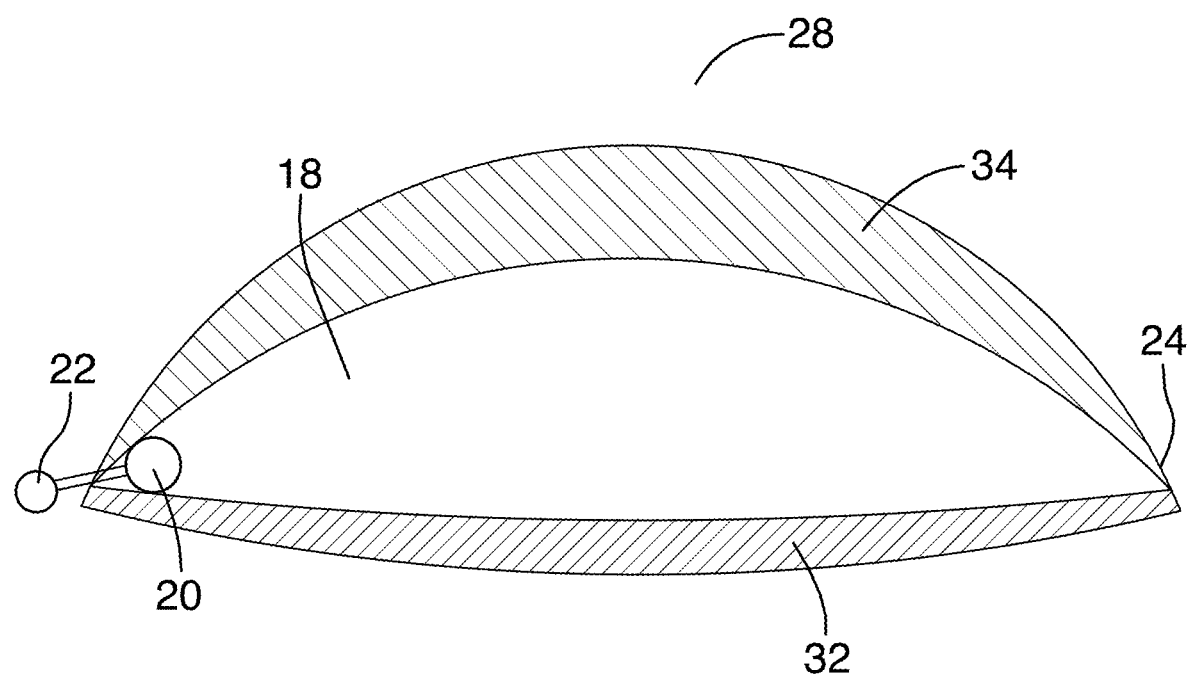
FIG. 15 is a longitudinal cross-sectional front view of a body shaping device showing the chamber and a pump.
Figure 16:
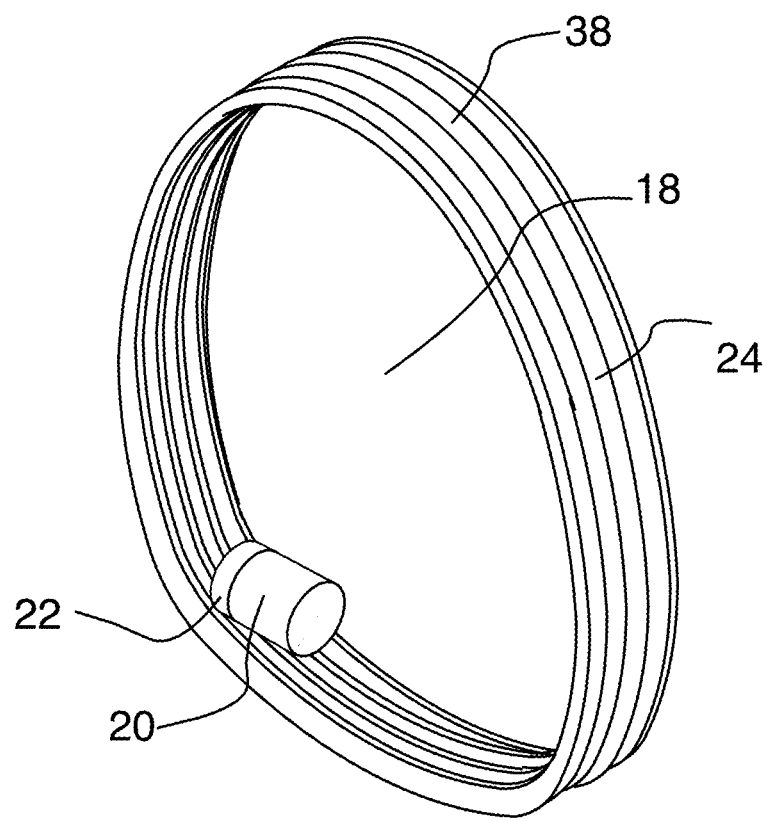
FIG. 16 is a perspective detailed rear view of the device of FIG. 15.
Figure 17:
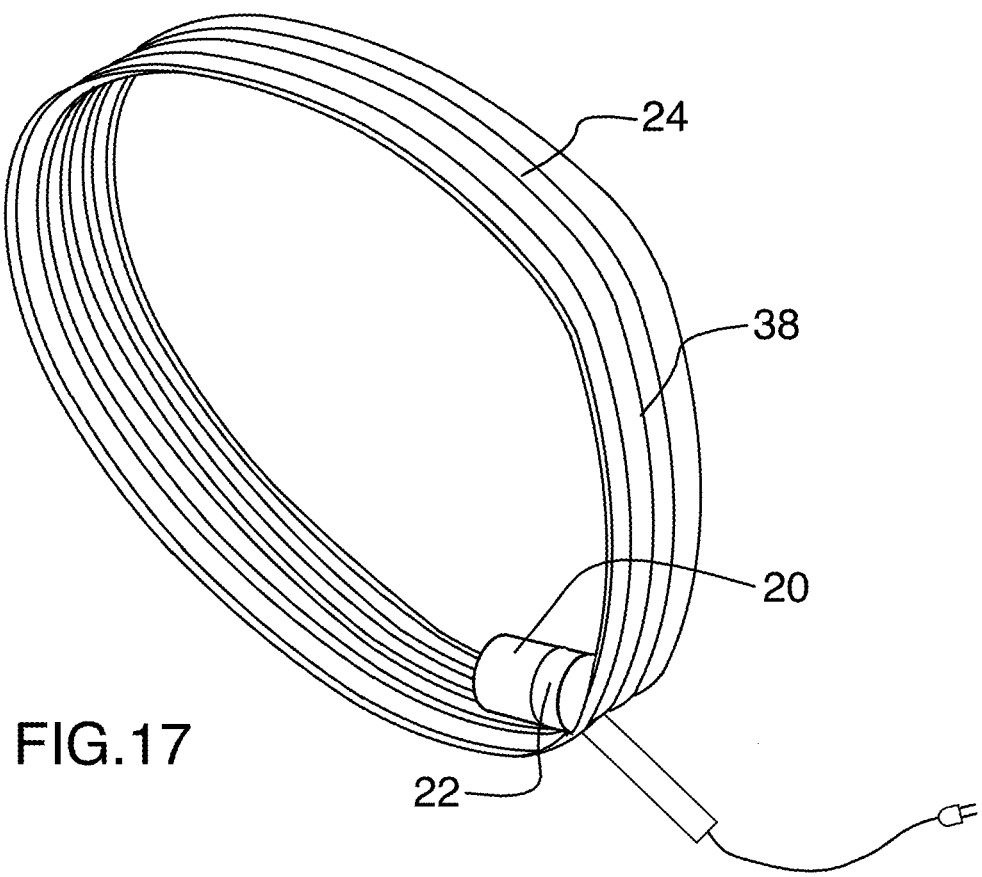
FIG. 17 is a perspective detailed view of the chamber showing the pump.

As best illustrated in FIGS. 15-17, the fluid chamber 18, which is in essence a bladder, includes a resilient fluid chamber sidewall 24 that is made from a resilient material that permits repeated inflation and deflation without losing its shape or physical integrity. The size and shape of the bladder 18 can be varied by varying the amount of the fluid pumped into and out of the bladder 18. The terms "fluid chamber" and "bladder" are used interchangeably throughout this description. The fluid chamber 18 may also include multiple sub-chambers to divide the interior so that a more customized fit can be achieved. Furthermore, the fluid chamber 18 is typically sized and shaped to snuggly locate against the body part in need of shaping or re-shaping. In the case of the breasts, the fluid chamber 18 can be located either underneath each of the breasts or around the breasts. In one example, the breast product is made of light, ultra-soft reduced weight silicone located on the inside and a thin layer of standard silicone on the outside, which provides a natural appearance of the breast. In the back center inside is the fluid chamber (air pocket) which is attached on both sides to a micro blue tooth pump.

Figure 15A:
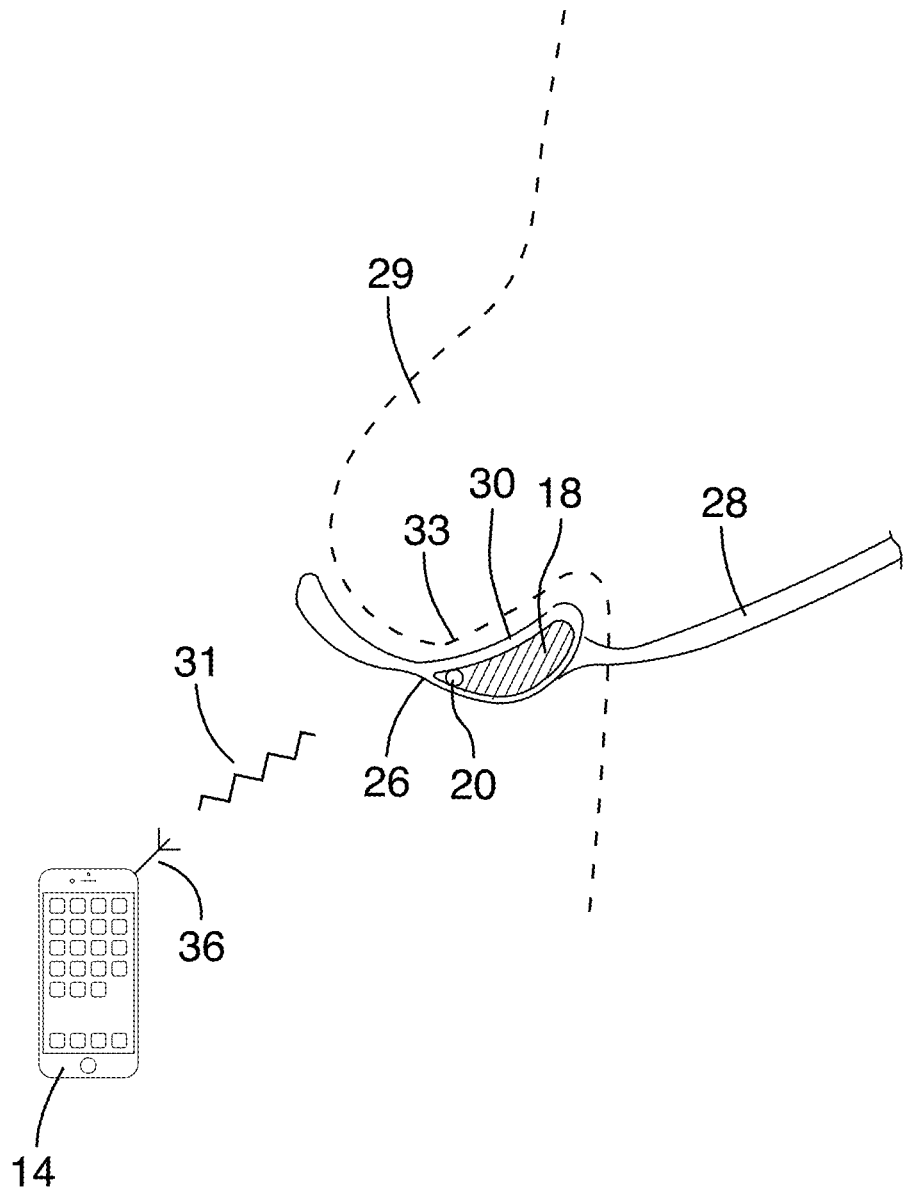
FIG. 15A is a diagrammatic representation of a garment pouch including a fluid chamber located in a brassiere.

As best illustrated in FIGS. 15 and 15A, the fluid chamber 18 can be housed permanently in a garment pouch 26 and which is integral with a garment 28, for example, a brassiere for use with the breasts 29. The fluid chamber 18 can be stitched in place or it can be held in place using friction between the resilient fluid chamber sidewall 24 and the garment pouch 26 in which a garment pouch sidewall 30 is located against the skin 33 of the user. As illustrated in FIG. 15A, the mobile electronic device 14 transmits the signal 31 to the pump 20

Figure 8A:
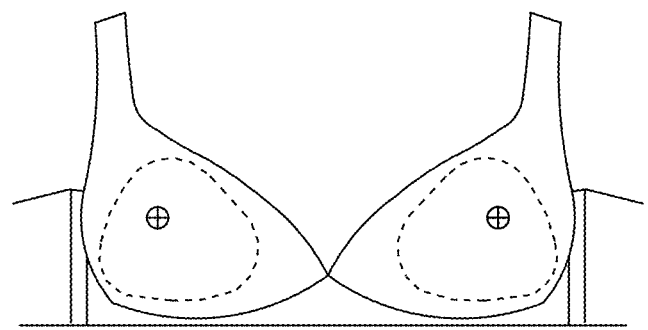
FIG. 8A—is a schematic diagram of a basic padded bra.
Figure 8B:
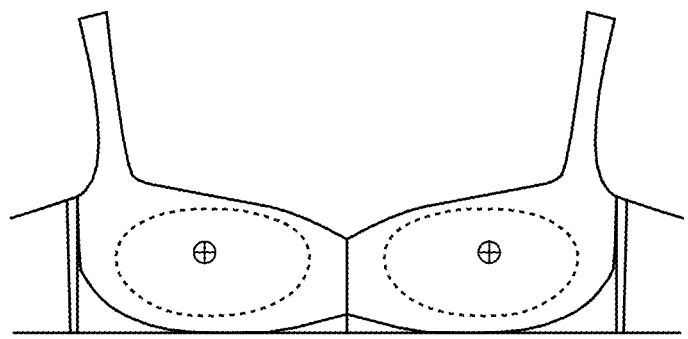
FIG. 8B is a schematic diagram of a no pad bra with stiff construction.
Figure 8C:
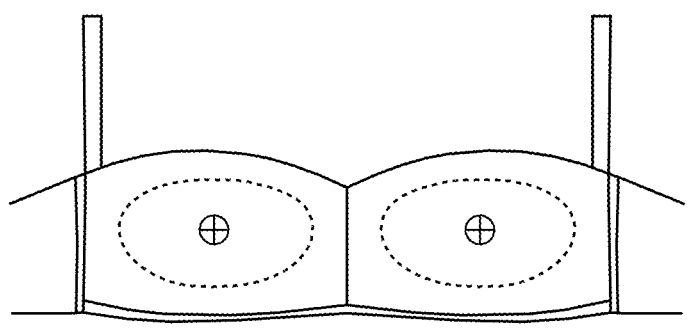
FIG. 8C is a schematic diagram of a strapless, wired bra.
Figure 9A:
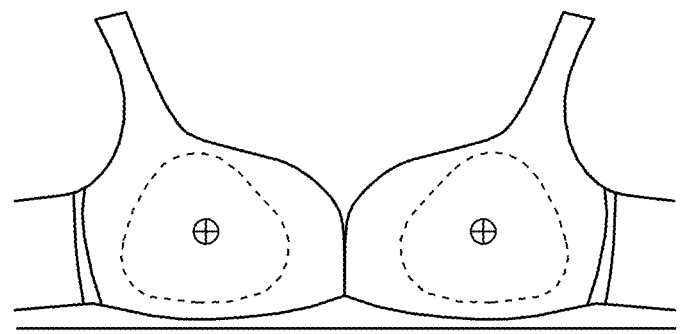
FIG. 9A—is a schematic diagram of a no wire bra.
Figure 9B:
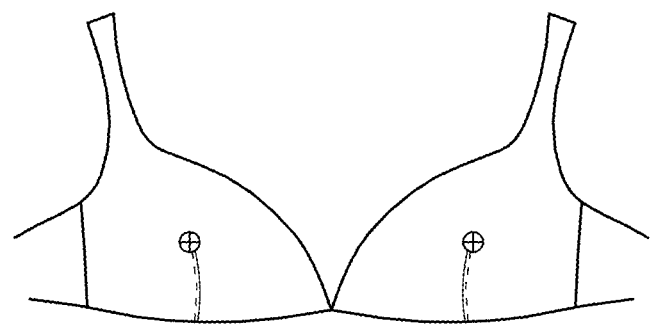
FIG. 9B is a schematic diagram of a soft up, no pad bra.
Figure 9C:
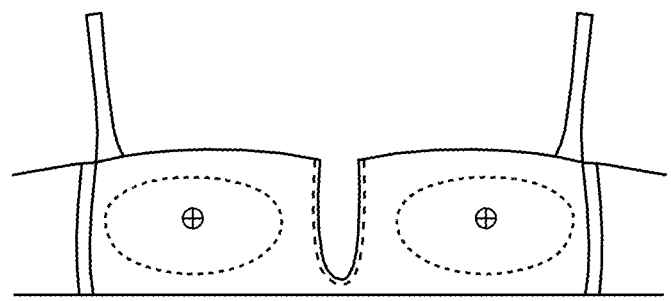
FIG. 9C is a schematic diagram of a bandeau bra.
Figure 10:
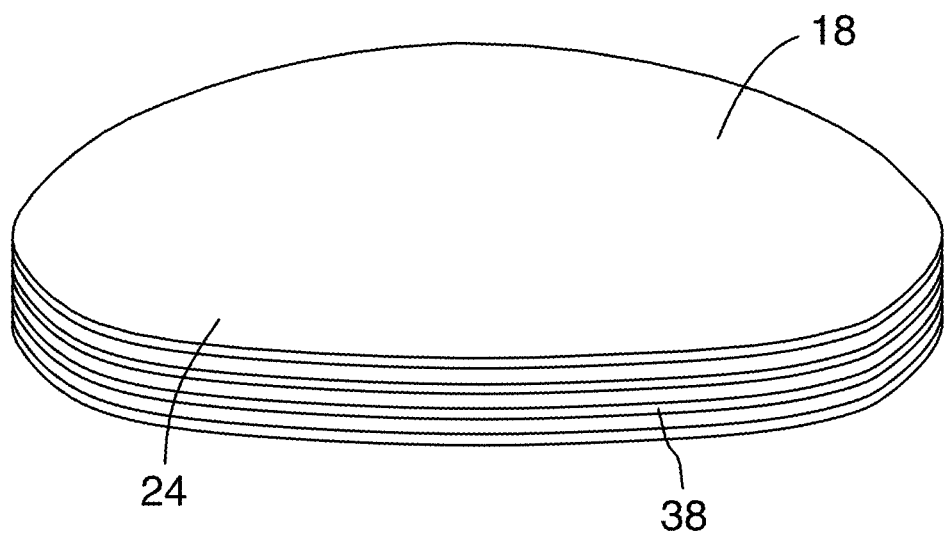
FIG. 10 is a perspective view of a chamber showing a resilient accordion joint.
Figure 11:
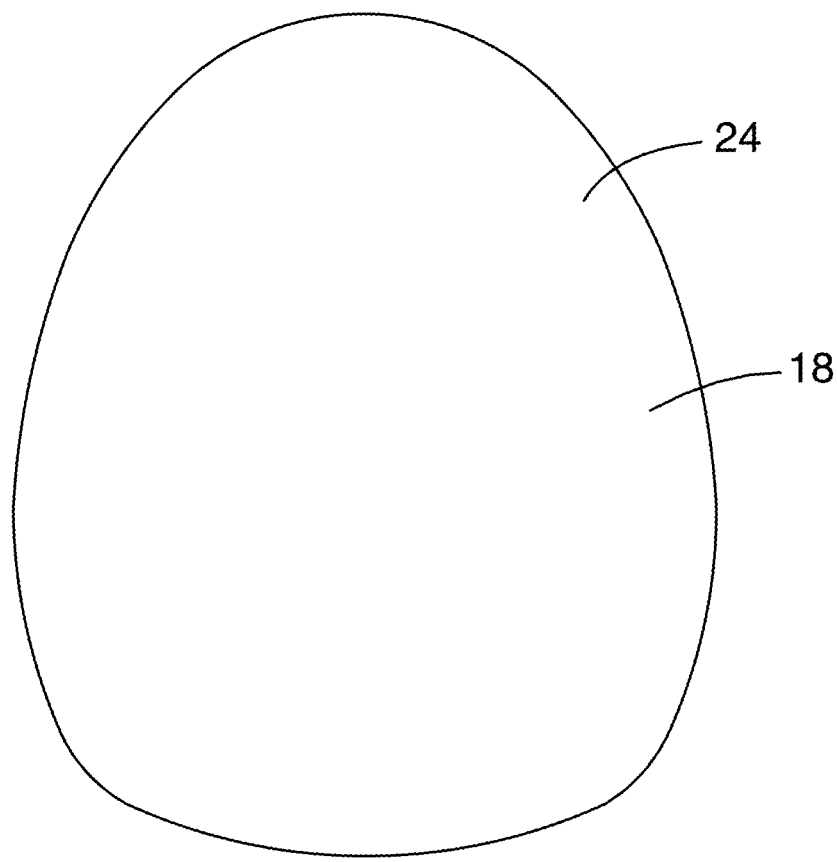
FIG. 11 is a top view of the chamber of FIG. 10.
Figure 12:
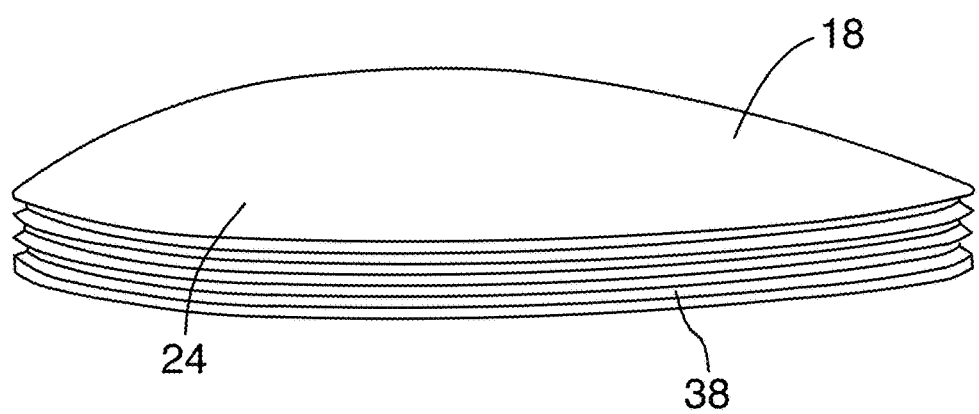
FIG. 12 is a side view of the chamber of FIG. 10.
Figure 13:
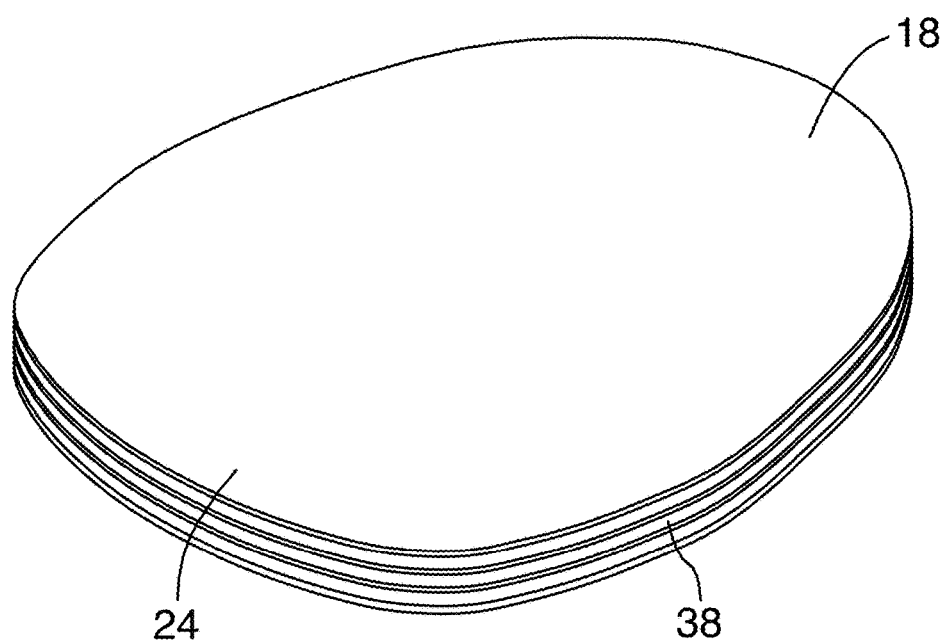
FIG. 13 is a top perspective view of the chamber of FIG. 10
Figure 14:
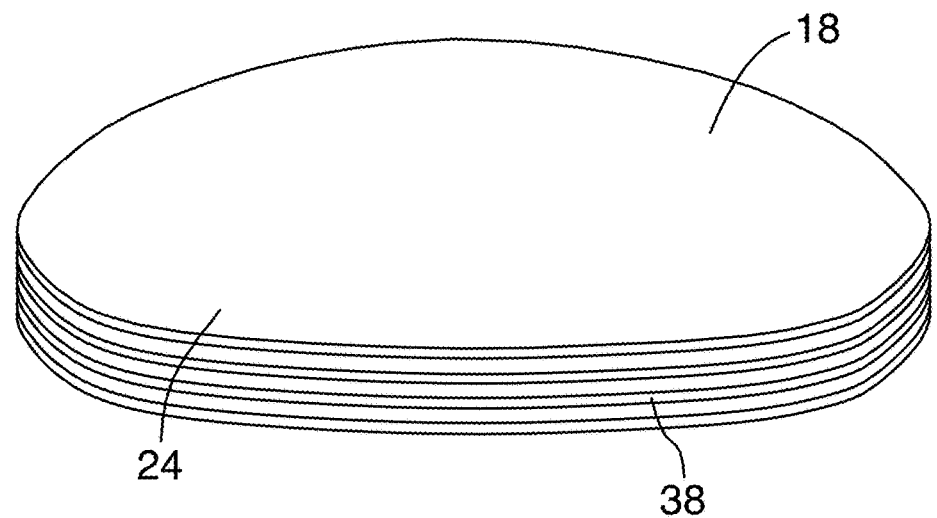
FIG. 14 is a perspective view of the chamber of FIG. 10 inflated with a fluid.

As best illustrated in FIGS. 8, 9 and 15, any design of brassiere 28 can house the fluid chamber 18. Furthermore, as is well known in the art, brassieres can be designed in numerous cup sizes and thus the system 10 can accommodate every and all shapes and sizes of brassiere. Additionally, the material used to manufacture the garments and the fluid chamber, are generally coated with anti-bacterial agents or anti-odour agents. The fabric itself can be made from anti-bacterial or anti-odour materials. When located in place, the fluid chamber 18 is completely seamless and can be located adjacent the underside of the breasts. The garments may have front and/or rear mesh panels. In the example shown in FIG. 15, an anti-bacterial pad 32 is for snug location against the skin of the user. The fluid chamber is inflated with air, which pushes against a gel layer 34, which can further form the body part, for example a breast 29.

Figure 3:
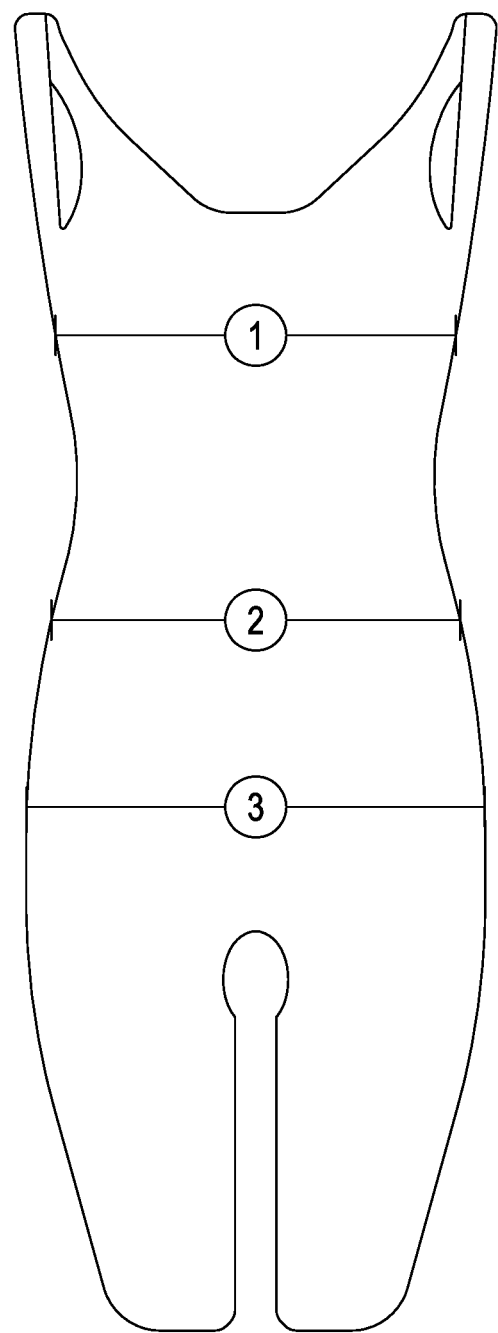
FIG. 3 is a schematic representation of a female body showing the location of body parts, for example breasts (1), waist (2), thighs (3)
Figure 4:
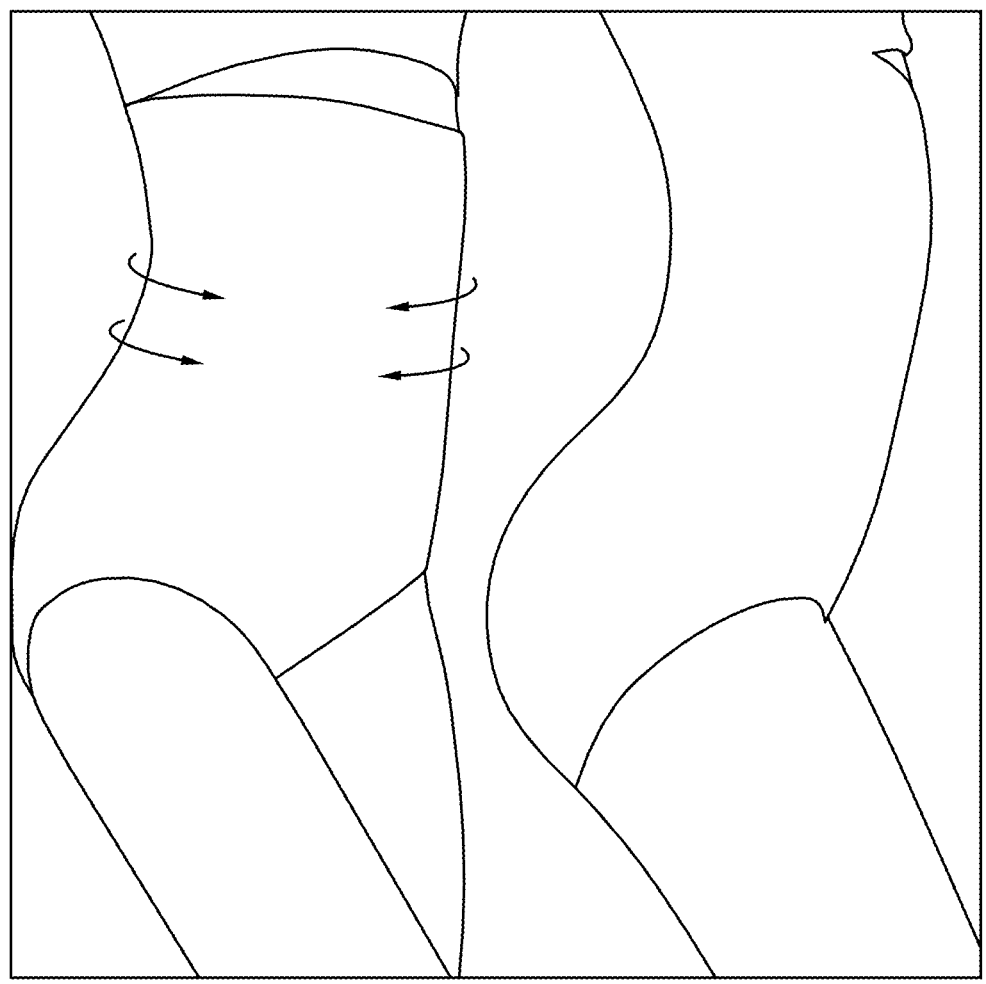
FIG. 4 is a diagrammatic representation of a female body illustrating a waist reducing application for the wireless system (in the direction of the arrows) showing the front torso and a side profile.
Figure 5:
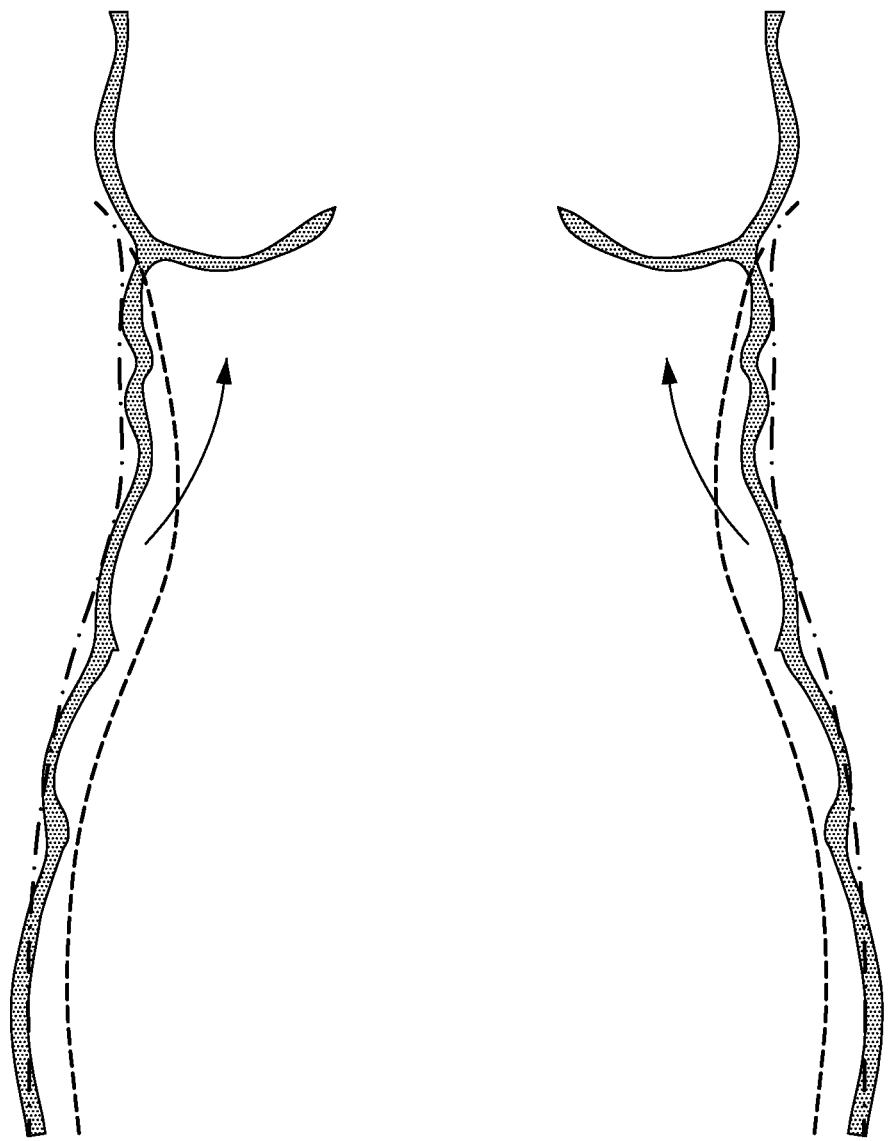
FIG. 5 is a diagrammatic representation of the waist reducing application (broken line, in the direction of the arrows from an initial body shape) compared to a standard waist reducing garment (broken dotted line)
Figure 6:
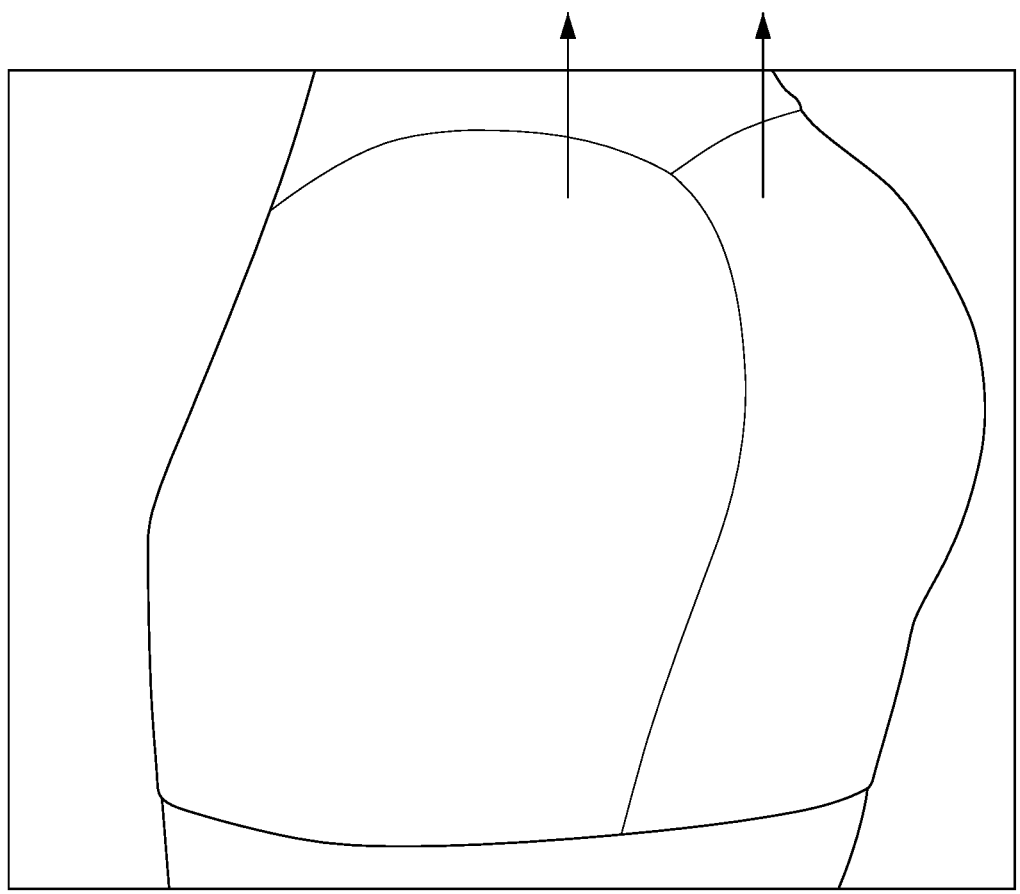
FIG. 6 is a rear view diagram of a buttock lifting (in the direction of the arrows) application of the wireless system.
Figure 7:
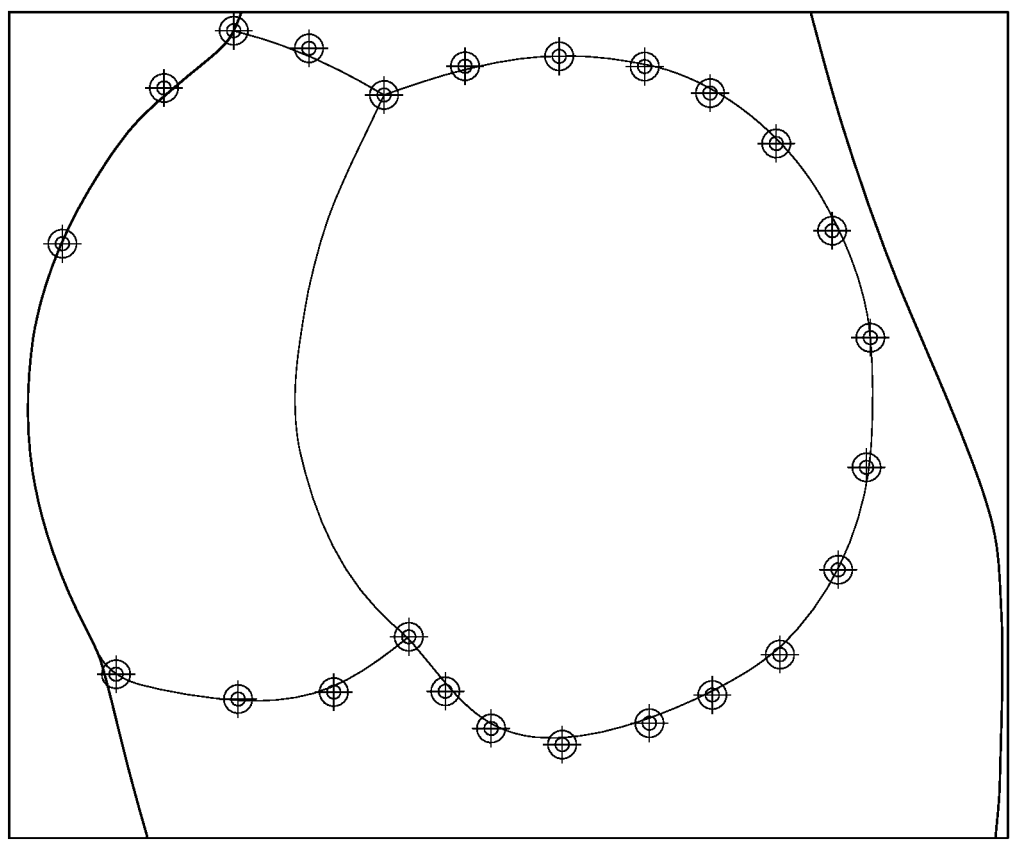
FIG. 7 is a rear view diagram of a buttock rounding application of the wireless system.

As best illustrated in FIGS. 3, 6 and 7. in the case of the buttocks, the fluid chamber 18 can be located either around each buttock or above the buttocks to, in essence, "pull" or "lift" the buttocks upwardly, or to give the observer the impression of a rounder and fuller buttock. In the case of the hips and/or waist, as best seen in FIGS. 3, 4 and 5, the fluid chamber 18 is located to push the waist inwards and/or to shape the hips into a more rounded shape or to elongate the waist or hips. The fluid chamber 18 includes the wirelessly operated fluid pump 20. The wirelessly operated pump 20 is fluidly connected to and in fluid communication with the fluid chamber 18. In applications of other body parts such as the thighs or the upper arms, the fluid chamber 18 can be located in, for example, shorts or in a body suit, so that the inflation/deflation thereof can re-shape or re-size one or more of the thighs either by compressing the front part of the thigh or the rear, adjacent the hamstrings. For the thighs, compression of the whole thigh can be achieved using a tubular fluid chamber which applies equal inwardly directed compression forces to achieve a shapelier thigh. Similarly, for the upper arms, a T-shirt or undershirt, for example, can be used to house the fluid chamber so that the inflation/deflation thereof can re-shape or re-size the upper arms either the biceps or the triceps, or if used in a tubular design, both the biceps and the triceps simultaneously.

Figure 2:
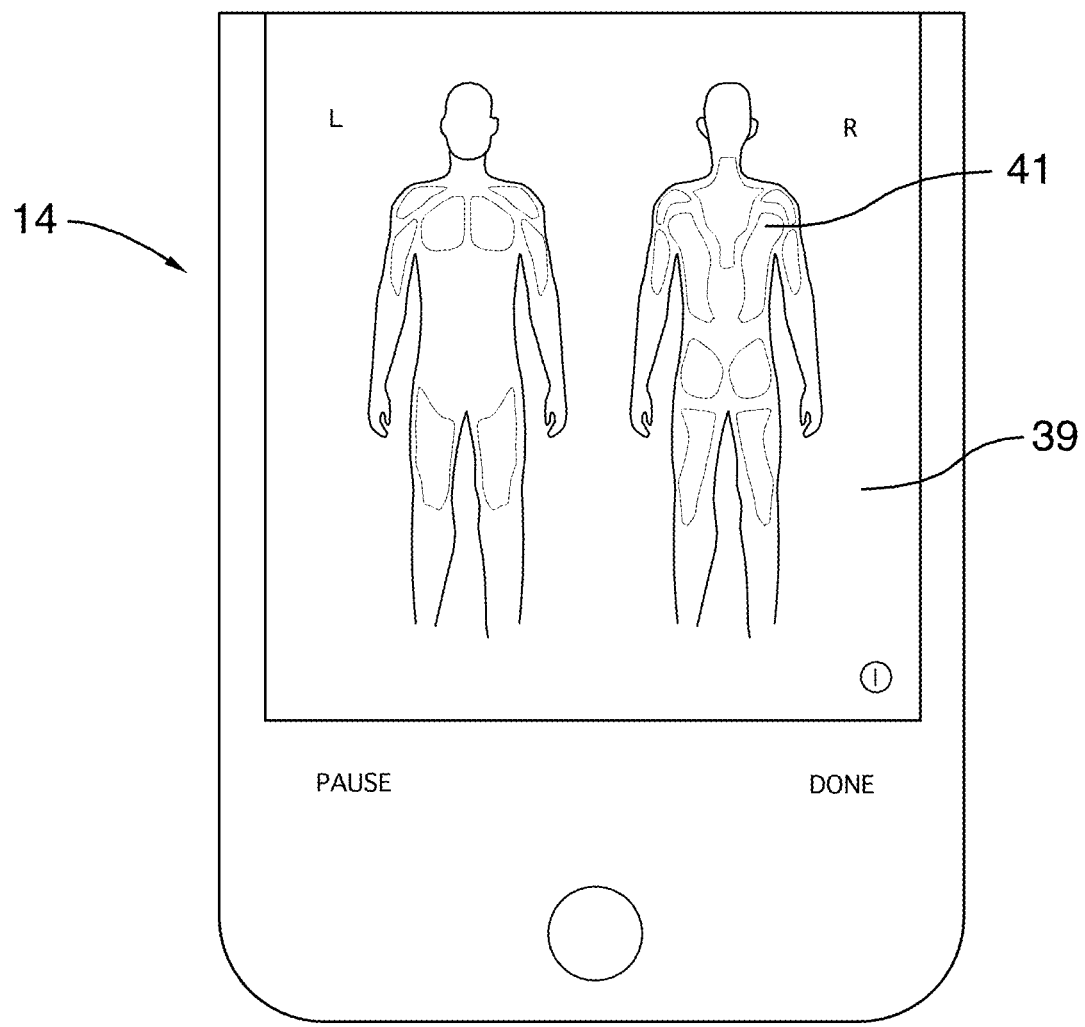
FIG. 2 is a mobile electronic device screen showing targeted body parts.
Figure 2A:
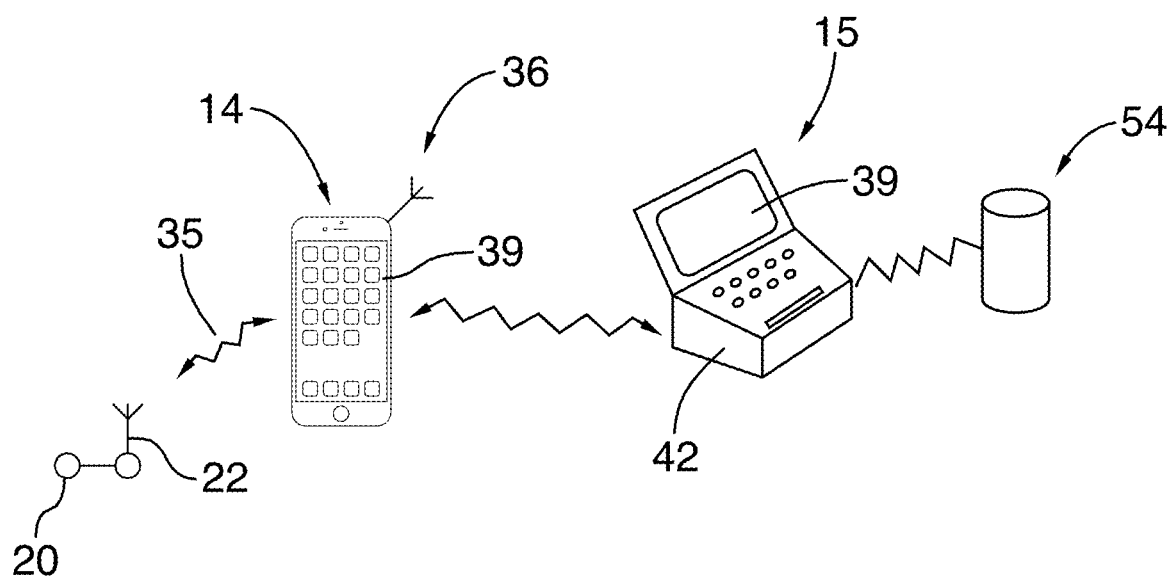
FIG. 2A is a diagrammatic representation of a wireless network showing a mobile electronic device.

Broadly speaking, and as best illustrated FIGS. 1, 2, 15, 15A, 6 and 17, the mobile electronic device 14 includes a signal transmitter 36, which is in wireless communication with the signal receiver 22 of the pump 20. A body part shape (and/or size) database is stored on the mobile electronic device 14 or can be remotely accessed from the Internet or personal computer database. The body part database includes a variety of different and desired body part shapes. The body part database and the signal transmitter 36 are wirelessly configured to permit the user to select a desired body part shape or size therefrom by pressing an icon on a display screen, as best illustrated in FIGS. 2 and 2A, after which an activating signal 35 is then wirelessly transmitted to the signal receiver 22 at the pump 20. The pump 20 once activated, pumps an amount of the fluid into the bladder 18 sufficient to cause inflation or deflation of the bladder 18 so as to achieve the desired body part shape. If desired, the user can select another desired body part shape, again from the body part shape (and/or size) database and the process is repeated until the body shape/size is achieved. The bladder 18 is deflated, if for example, the user wishes to remove the garment, by selecting a deflate option from the display screen.

It is to be understood that the amount of the fluid located in the fluid chamber 18 or sub-chambers is sufficient to vary a shaping force that the resilient fluid chamber sidewall 24 applies inwardly or upwardly against the body part to achieve the desired body part shape. The fluid chamber 18 can be either an independent piece or it can be located in the garment portion located against the body part. In the latter case, the garment portion and the bladder 18 are registerable (and cooperable) with each other so that an inflation, or deflation of the bladder 18 causes a similar movement of the garment pouch sidewall 30 against the body part, as best seen in FIG. 5 and FIG. 15A.

The garment portion resilient sidewall is cooperable with the chamber resilient sidewall. The fluid pump 20 and the chamber 18 are disposed in the garment pouch 30 located in the garment portion. The garment pouch 30 is located snug against the skin of the user's body part to be shaped. The garment portion is a cup of a brassiere and is located snuggly against the underside of a breast 29. The garment portion include both cups of a brassiere with each garment pouch located snuggly against the underside of each of the breasts. Examples of the garment portion include typically, but not limited, the cups of a brassiere, the legs portion of either a body suit or a pair of shorts, the arms of either a T-shirt or undershirt, or indeed any piece of a garment that permits location of the fluid chamber adjacent to a body part in need of re-shaping or re-sizing. In the case of the shorts or body suit, an openable gusset is provided to permit bathroom use.

Referring to FIGS. 3, 4, 5, 6 and 7, for use with the waist, the hips, or the buttocks of the user, the garment portion is a band, which is located around the waist so as to provide an inwardly directed force to re-shape the waist of the user, when the bladder 18 is inflated. Alternatively, the garment portion is one or more pads, which are located around the waist or the hips. This also provides an inwardly directed force to re-shape the waist or the hips. In the case of the buttocks, one or more pads are located around or above one or both buttocks to provide an upwardly directed force to pull or uplift the buttocks. Alternatively, one or two cups are located snuggly against one or both buttocks of a user so as to shape the buttocks of the user.

The pump 20 is configured to selectively move fluid into and out of the chamber 18 or, if present, one or more sub-chambers.

Referring now specifically to FIGS. 10-17, the fluid chamber 18 includes a resilient joint 38 to permit movement between a collapsed configuration in which the fluid content is at a low volume and an inflated configuration. In the example shown, the resilient joint 38 is an accordion joint. However, the resilient joint 38 can also be a telescoping joint or some mechanical equivalent.

As noted above, the body part shape database is stored remotely on an external database and accessible using an internet connecting device, such as the mobile electronic device. In the examples shown, the mobile electronic device can be handheld and includes, but not limited to, a smart phone, a tablet, or it can be a personal computer, if for example the user wishes to carry out the body shaping without using the hand-held device.

The external database is located on a computer network, such as, for example, the internet. The body part shape database is located remote from the user. In one example, the body part shaping database can continuously update, so that when the user requests the body part shaping data from the database, the updated body part shape data is calculated and displayed on the mobile electronic device. There are advantages to this. For example, if the user is trying to lose weight, they can monitor their progress remotely or locally by how much their current body part shape or size such as the waist or the hips, has altered compared to a pre-set date. This can be beneficial to personal trainers, for example who may wish to monitor their client's progress, or if a physician needs to closely monitor the progress of a patient's weight-loss if their current weight poses significant health risks.

Referring to FIGS. 1, 2, and 2A in a home environment, for example, the mobile electronic device 14 is connected wirelessly or via a wire, to a computational machine 15, such as a personal computer. Both the mobile electronic device and the computational machine include a display screen 39. When a command is sent from the mobile electronic device to the computational machine, the screen is set to a default setting. The setting is pushed (transmitted) to the body part shape database. When the user is ready to begin activating the pump 20, the user uses the mobile electronic device 14 to begin. The default configuration will be shown on the display screen and be pushed to the database.

Still referring to FIGS. 1, 2, and 2A, on the mobile electronic device 14, the display screen typically includes one or multiple display screens or Graphical User Interface (GUI) icons 41, which are connected to one or more output ports located on the computational machine, which runs a program that permits activation of the pump and synchronizes with a database server.

The hand-held electronic mobile device obtains the database displayed on the display screen. In one example, a mobile phone device requests access to the internet database containing information uploaded by the user or a third party.

Our simple, yet effect system overcomes the difficulties found with conventional body shaping garments, in which manual pumping, which are uncomfortable to use and do not provide sufficient bespoke shaping or sizing. Our system adds a synchronization component with an external server, which now permits remote monitoring of the body shape. Our system uses a physical component and a logic component.

Broadly speaking, the system 10 further includes 1) the display screen, which will display the body part database; 2) the computational machine located remotely from the user and the mobile electronic device: a) pushing the current database to the display on the mobile electronic device, and b) pushing the current body part shape/size to the remote database via the internet; 3) the mobile electronic device which will allow the user to change (increment/decrement) the body part appearing on the screen and remote database (if needed); and 4) a power source. All of the components are packaged together into a physical device, such as a hand-held electronic mobile device for example, a smartphone, a tablet and the like.

The computational machine is the driver and controller of both the displays and the connection to the internet database or a local database. It also handles input commands from the user via an I/O interface (either wired or wireless) to display the body part size/shape.

The user holds a register in a non-transitory memory, containing a defaults image. When powered on, the default image will be outputted to the physical display and simultaneously uploaded to the internet database. The system will also take note of the time this value was initialized. When the user input requests (selects) a desired body part shape or size, the system simultaneously updates the physical display and internet database. It will also take note of the time this request/selection was initiated.

The mobile electronic device is the method the user can select the body part shape or size being displayed on the screen. This consists of either a wired button, or wireless (IR, RF, internet) transmission of a user action, that results in the activation of the signal transmission.

In addition to the aesthetic aspects of our design, it is also possible to embed a plurality of biosensing patches into one or more of the brassiere cups. The biosensor patches are designed to detect abnormalities in breast thermal patterns and tissue elasticity. Such abnormalities are known to be indicative of early stage breast cancer in women.

The patches are located snuggly adjacent the breast and collect data in real time, which is transmitted to the user's phone or tablet using wireless technology. The data transmitted can be sent directly to a physician's office.

It is known that as cancer cells multiply, blood vessels grow around them in a process known as angiogenesis, in order to provide nutrients that allow the tumor to grow. These blood vessel formations are distinguishable from those naturally occurring in the body, and hence breast cancer risk can be assessed by detecting the thermal patterns associated with them.

In addition to thermal abnormalities, benign and malignant tissues have different elastic properties. Therefore, breast cancer risk can be assessed by quantifying tissue elasticity in situ. A plurality of tactile sensors generate smooth vibrations that excite the breast tissue surrounding the mammary glands, generating elasticity data, which can be analyzed to determine the presence of abnormal masses.

Operation of the System

Using the system described herein would be very straightforward and takes advantage of current Wi-Fi telecommunications, such as Bluetooth™ to ensure the user can wirelessly modify their body part shape and/or size in a bespoke manner.

After the user puts the garment on, they select the desired body part shape from the body part shape database displayed on the electronic device. The software stored in the transient or non-transient memory activates the transmitter to wirelessly transmit a signal to the pump receiver, which is typically located remote from the electronic device.

The signal is received at the pump which then, depending on the nature of the signal, either pumps an amount of the fluid into the bladder, the amount correlating to the desired body part size or shape, or removes an amount of the fluid therefrom. The varying amounts of the fluid being pumped into or out of the varies the size of a force applied to the body part for a time sufficient to achieve the desired body shape.

Referring now to FIGS. 1-3, the logic component of the system 10 will be described. The computational machine includes at least one processor and the non-transient memory in the form of one or more computer-readable media, on which are stored computer-executable instructions that, when executed by the processor, configures the processor to begin wirelessly transmitting a signal to the pump 20.

Figure 18:
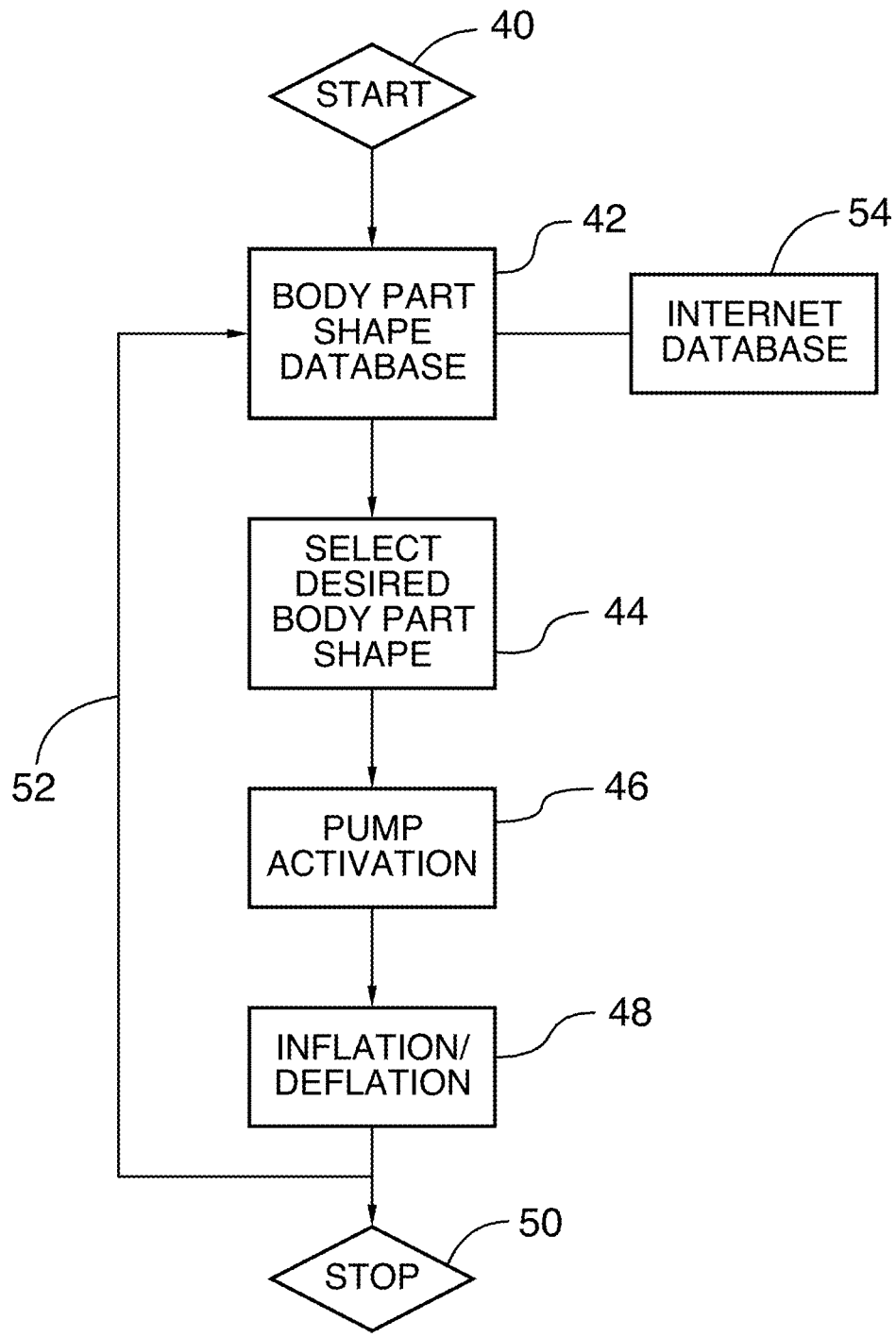
FIG. 18 is a flow diagram of the system method steps.

Referring to FIG. 2 and FIG. 18, the user begins the initiation at start block 40. At block 42, a body part shape database is displayed, from which the user selects then selects a desired body part shape. The computer-executable instructions are then activated which cause, at block 42 and 44, body shape data to be wirelessly transmitted from the database to the pump at block 46. The body shape data, which is displayed on the display, may include a user's name; date and an image of the desired body part shape. At block 46, the pump is activated and pumping begins at block 48. When the desired body part shape is achieved, at block 50, a stop signal is received at the pump. At 52, the body part data is updated in the database.

The body part shape data is continuously updated by synchronizing the data with the internet database in real-time so that so that when the user requests the body shape data, the updated data is calculated and displayed on the user's mobile electronic device. The user is informed when the desired body part shape is achieved.

Still referring to FIG. 18, at block 42, the user can access the internet database 54 and to view the body shape options on the mobile electronic device 14.

Advantageously, our system, unlike conventional mechanical systems, further provides users and garment manufacturers with a smartphone-based application, to keep track of their body part size and/or shape.

If desired, the user can have free-of-charge access to view, for example, the body part shape database, while at a nominal fee, premium features may be offered, such as weight loss programs with continuous monitoring and data uploading to a third party which can be accessed remotely. Additionally, garment manufacturers can optionally pay a subscription fee to gain access to analytics, such as body shape of a client and number of customers, and be able to compare various shapes to see how their clients' weight loss program is progressing and make corrections to the garment' manufacture.

Other Embodiments

From the foregoing description, it will be apparent to one of ordinary skill in the art that variations and modifications may be made to the embodiments described herein to adapt it to various usages and conditions.

We claim:

1. A brassiere having one or two cups, the brassiere comprising:
a chamber for a fluid having a resilient chamber sidewall snuggly located against one breast or both breasts, the chamber being Located in the one or both cups of the brassiere,
a wirelessly operated pump in fluid communication with the chamber for varying an amount of the fluid located in the chamber, the pump having a signal receiver connected thereto; and
a signal transmitter in wireless communication with the pump, the signal transmitter being in electronic communication with a breast shape and breast size database, the breast shape and breast size database and the signal transmitter being configured to wirelessly transmit a first signal to the pump when a user selects a first desired breast shape or size from the breast shape and breast size database, to activate the pump so as to import a corresponding amount of fluid to the chamber thereby modifying at least one of: i) a shape and ii) a size of the one breast or both breasts to achieve the first desired breast shape or breast size.

2. The brassiere, according to claim 1, in which the breast shape and breast size database and the signal transmitter are configured to wirelessly transmit a second signal to the pump when a user selects a second desired breast shape and breast size from the database to activate the pump so as to vary the amount of the fluid in the chamber thereby modifying at least one of: i) a shape and ii) a size of the one breast or both breasts to achieve.

3. The brassiere, according to claim 2, in which the first signal activates the pump to pump an amount of the fluid into the chamber; and the second signal activates the pump to pump an amount of the fluid out of the chamber.

4. The brassiere, according to claim 2, in which the amount of fluid imported in the chamber modifies a shaping force the resilient sidewall applies against the one or both breasts.

5. The brassiere, according to claim 2, in which the amount of fluid imported in the chamber modifies the appearance of one or two breasts to the desired breast shape and breast size.

6. The brassiere, according to claim 1, in which at Least one cup of the brassiere includes a pouch, the chamber being Located in the pouch adjacent the breast.

7. The brassiere, according to claim 6, in which the pouch includes a pouch resilient sidewall cooperable with the chamber resilient sidewall, the fluid pump and the chamber being disposed in the pouch located in the one or both cups.

8. The brassiere, according to claim 6, in which the chamber and the pouch are Located snugly against an underside of one or both breasts.

9. The brassiere, according to claim 1, in which the chamber includes first and second sub-chambers.

10. The brassiere, according to claim 9, in which the pump is configured to selectively move fluid into and out of one or both of the first or second sub-chambers.

11. The brassiere, according to claim 1, in which the chamber includes a resilient joint to permit movement between a collapsed configuration in which the fluid content is at a tow volume and an inflated configuration.

12. The brassiere, according to claim 11, in which the resilient joint is an accordion joint or a telescoping joint.

13. The brassiere, according to claim 1, in which the breast shape and breast size database is stored on a mobile electronic device, the mobile electronic device being a smart phone, a tablet, or a personal computer.

14. The brassiere, according to claim 1, in which the breast shape and breast size database is stored remotely on an external database and accessible using an internet connecting device.

15. The brassiere, according to claim 14, in which the external database is located on a computer network.

16. The brassiere, according to claim 1, in which the breast shape and breast size database is stored remotely on an external database located on the internet and accessible using an internet connecting device.

17. The brassiere, according to claim 1, in which the breast shape and breast size database is Located remote from a user, the breast shape and breast size database being continuously updated, so that when the user requests the breast shape and breast size data, the updated breast shape and breast size data is calculated and displayed on a mobile electronic device.

18. A method for achieving a desired shape or size of one or both breasts using an electronic device, the method comprising:
selecting a first desired breast shape and breast size from a breast shape and breast size database stored on the electronic device so as to activate a pump located in one or both cups of a brassiere;
wirelessly transmitting a signal to the pump Located remote from the electronic device;
receiving the signal at the pump; and
pumping varying amounts of a fluid into and out of a fluid chamber located in the one or both cup to vary a shape and a size of the breast or breasts to achieve the desired breast shape and breast size.

19. A computer-implemented method for achieving a desired shape or size of one or both breasts, the method comprising:
on an electronic device, selecting a first desired shape or size of one or both breasts from a breast shape and breast size database stored on the electronic device so as to activate a pump located in one or two cups in a brassiere;
wirelessly transmitting a signal to the pump located remote from the electronic device;
receiving the signal at the pump; and
pumping varying amounts of a fluid into and out of a fluid chamber Located in the one or both cups to vary a shape and a size of the one or both breasts to achieve the desired breast shape or breast size.

\* \* \* \* \*